United States Patent
Kondo et al.

(10) Patent No.: US 8,146,228 B2
(45) Date of Patent: *Apr. 3, 2012

(54) AUTOMOBILE RUN CHANNEL FITTING METHOD AND DEVICE

(75) Inventors: Toshiyuki Kondo, Saitama (JP); Saeko Komatsu, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 800 days.

This patent is subject to a terminal disclaimer.

(21) Appl. No.: 11/709,740

(22) Filed: Feb. 23, 2007

(65) Prior Publication Data

US 2007/0193016 A1   Aug. 23, 2007

(30) Foreign Application Priority Data

Feb. 23, 2006  (JP) .................. 2006-047170

(51) Int. Cl.
*B23P 11/02* (2006.01)
(52) U.S. Cl. ........................................... 29/451; 901/41
(58) Field of Classification Search .................. 29/450, 29/700, 235, 451, 525; 901/41
See application file for complete search history.

(56) References Cited

U.S. PATENT DOCUMENTS

| | | | | | |
|---|---|---|---|---|---|
| 4,653,166 A | * | 3/1987 | Bright | ............................. | 29/235 |
| 5,179,774 A | * | 1/1993 | Massie | ............................. | 29/451 |
| 5,201,106 A | * | 4/1993 | Moore et al. | ............... | 29/407.05 |
| 5,226,259 A | * | 7/1993 | Yamagata et al. | ............... | 49/502 |
| 5,735,032 A | * | 4/1998 | Stone | ............................. | 29/235 |

FOREIGN PATENT DOCUMENTS

| | | |
|---|---|---|
| JP | 2005-247016 | 9/2005 |
| JP | 2005-247270 | 9/2005 |
| JP | 2005247270 A * | 9/2005 |

* cited by examiner

*Primary Examiner* — David Bryant
*Assistant Examiner* — Jacob Cigna
(74) *Attorney, Agent, or Firm* — Arent Foxx LLP

(57) ABSTRACT

An automobile run channel fitting device for fitting a run channel into an automobile door sash comprising a pair of robot arms 1 and 2 which act in harmony and a run channel fitting jig 3 attached to each robot arm, wherein the run channel fitting jig 3 comprises an upper roller unit 12 adapted to push the run channel to fit it into an upper sash, a rotatable lower roller 14 adapted to push the run channel to fit it into a lower sash, and a lower roller supporting means 15 adapted to support the lower roller 14 and insert the lower roller 14 into a gap formed between an inner panel and an outer panel. The lower roller supporting means 15 comprises a sliding mechanism 17, a bending section 18 and a roller supporting section 19.

2 Claims, 9 Drawing Sheets (a)

(b)

(a)

(b)

(c)

(d)

(e)

AUTOMOBILE RUN CHANNEL FITTING METHOD AND DEVICE

BACKGROUND OF THE INVENTION

1. Field of the Invention

The present invention relates to an automobile run channel fitting method and device for fitting a run channel for an automobile door into an automobile door sash using a robot arm.

2. Description of the Prior Art

As a device for fitting a run channel for an automobile door into a depressed groove of an automobile door sash, a run channel assembly device is known, which comprises a frame made of steel plate attached to a robot arm, a run channel forming mechanism disposed above the frame, a run channel carrying mechanism disposed in front of the run channel forming mechanism in the frame, and a run channel guide mechanism disposed on the front end of the frame (For example, refer to Patent Document 1).

Also known as a method for fitting a run channel for an automobile door into a depressed groove of an automobile door sash is a run channel fitting method, which comprises the steps of setting a run channel for an automobile door at a pair of robot arms, pushing the run channel for the automobile door set at the pair of robot arms into a corner section of an automobile door sash, and inserting a roller pushing means attached to at least one of the robot arms into a depressed section of the run channel for the automobile door to move it from the corner section of the automobile door sash, thereby fitting the run channel for the automobile door into the depressed groove of the automobile door sash (For example, refer to Patent Document 2).

[Patent Document 1] Japanese Patent Application Publication No. 2005-247016

[Patent Document 2] Japanese Patent Application Publication No. 2005-247270

Referring to the run channel assembly device disclosed in Patent Document 1, the run channel must be pushed into a lower sash by pitch feed from a predetermined position above a door panel. In this case, there is a restriction in the position of the run channel relative to the sash. Thus, there are problems in that it takes a certain number of man-hours and an exclusive work station must be installed.

Referring to the run channel fitting method disclosed in Patent Document 2, there is no disclosure for a method for fitting the run channel into the lower upper side. Thus, there is a problem in that this can not cope with fitting of the entire run channel.

SUMMARY OF THE INVENTION

It is therefore an object of the present invention to provide a versatile run channel fitting method and device for an automobile door which can solve the problems stated above, contribute to the reduction of manpower, and deal with a variety of models.

In order to attain this object, according to a first aspect of the present invention, an automobile run channel fitting method for fitting a run channel into an automobile door sash using robot arms is provided, which comprises the steps of press-inserting an upper roller attached to at least one of the robot arms into a depressed section of the run channel to move it from a corner section of an upper sash, thereby fitting the run channel into the upper sash, and press-inserting a lower roller attached to the robot arm and inserted into an automobile door through a gap formed between an inner panel and an outer panel into a depressed section of the run channel, to move it downwards from the upper side of a lower sash, thereby fitting the run channel into the lower sash.

According to a second aspect of the present invention, an automobile run channel fitting method for fitting a run channel into an automobile door sash using robot arms is provided, which comprises the steps of, after an operator pushes both corner sections of the run channel into a corner section of an upper sash, press-inserting an upper roller attached to at least one of the robot arms into a depressed section of the run channel to move it from the corner section of the upper sash, thereby fitting the run channel into the upper sash, and press-inserting a lower roller attached to the robot arm and inserted into an automobile door through a gap formed between an inner panel and an outer panel into a depressed section of the run channel, to move it downwards from the upper side of a lower sash, thereby fitting the run channel into the lower sash.

According to a third aspect of the present invention, an automobile run channel fitting device for fitting a run channel into an automobile door sash is provided, which comprises a pair of robot arms which act in harmony and a run channel fitting jig attached to each robot arm, wherein the run channel fitting jig comprises an upper roller for pushing the run channel to fit it into an upper sash, a rotatable low roller for pushing the run channel to fit it into a lower sash, and a lower roller supporting means for supporting the lower roller and inserting it into a gap formed between an inner panel and an outer panel.

According to a fourth aspect of the present invention, the automobile run channel fitting device according to the third aspect in which a driving means is provided to rotate the upper roller at the same travel speed with or a slightly faster travel speed than the robot arm in the direction opposite from the robot arm, is provided.

According to a fifth aspect of the present invention, the automobile run channel fitting device according to the third or fourth aspect in which the lower roller supporting means is provided with a bending section to allow the lower roller to move along the curved shape of the lower sash, is provided.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
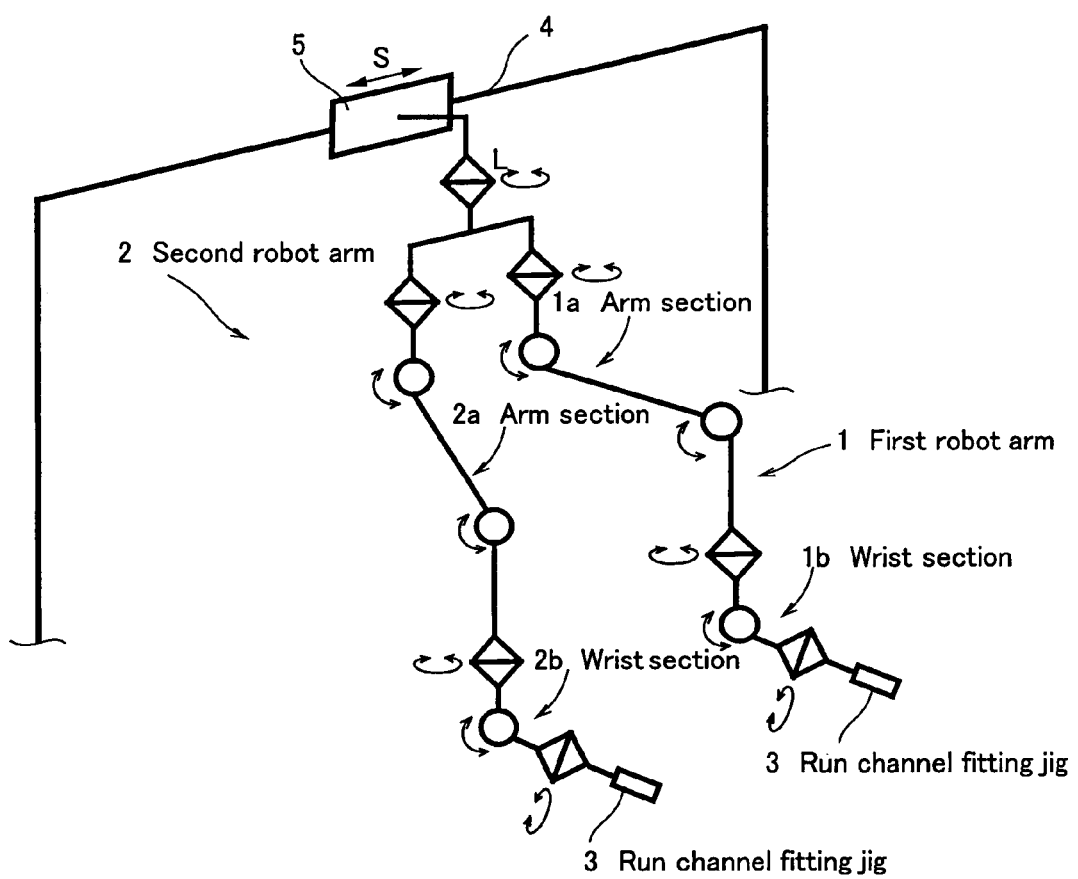
FIG. 1 is a schematic diagram of an automobile run channel fitting device according to the present invention.
Figure 2:
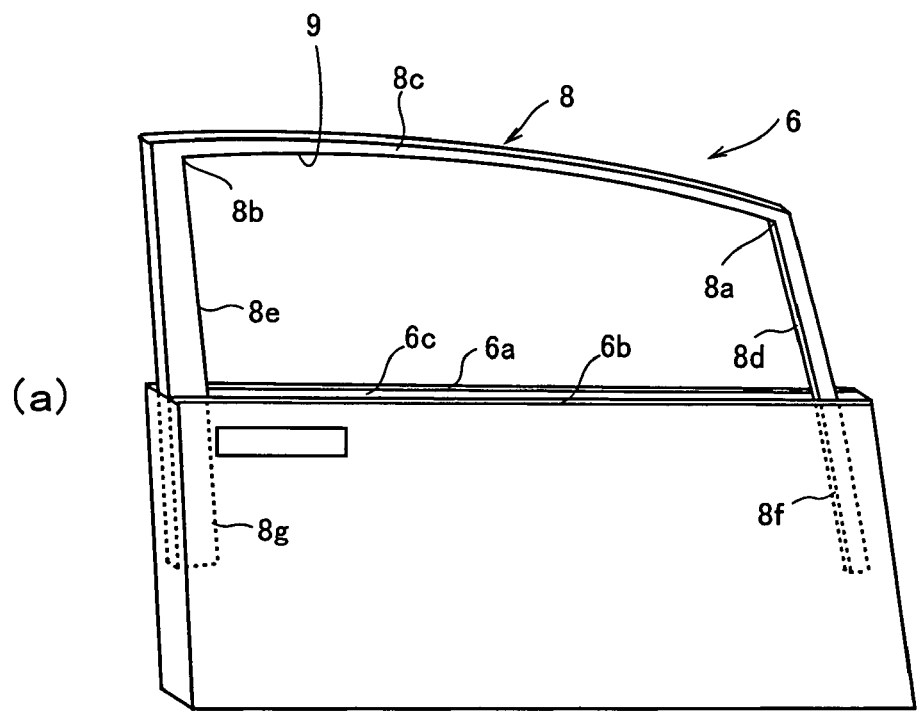
FIG. 2 (*a*) is a perspective view of an automobile door and FIG. 2 (*b*) is a cross-sectional view of a run channel for the automobile door.
Figure 2:
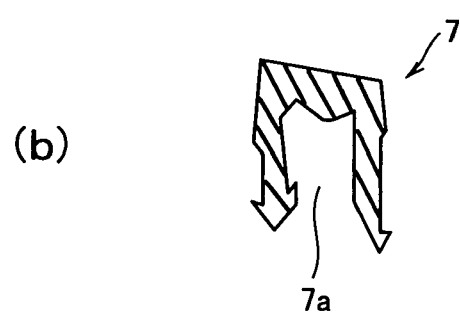
Figure 3:
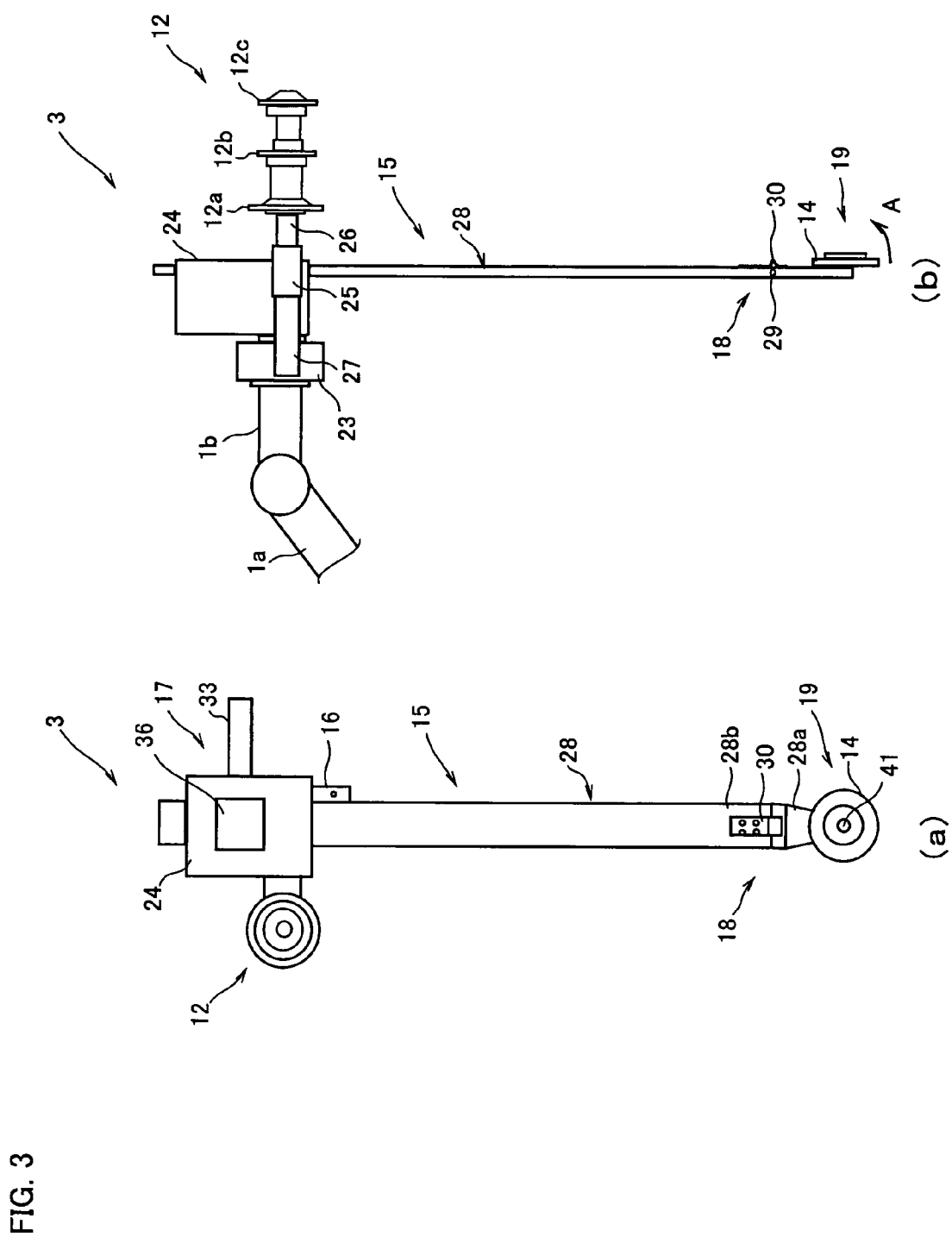
FIG. 3 is a schematic view of a run channel fitting jig, wherein FIG. 3 (*a*) is a front view of the run channel fitting jig and FIG. 3 (*b*) is a side view thereof.
Figure 4:
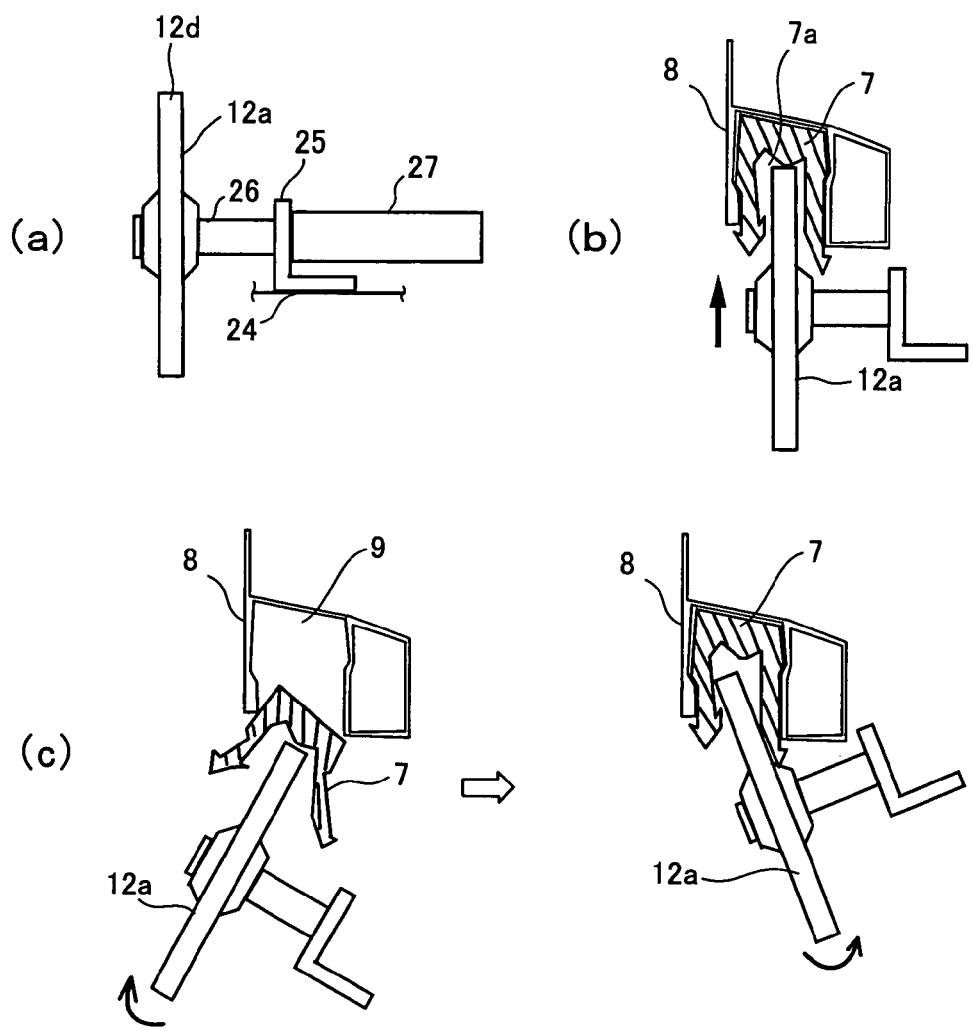
FIG. 4 is a schematic view of an upper roller, wherein FIG. 4 (*a*) is a side view of the upper roller and FIGS. 4 (*b*) and (*c*) are explanatory views of operation.
Figure 5:
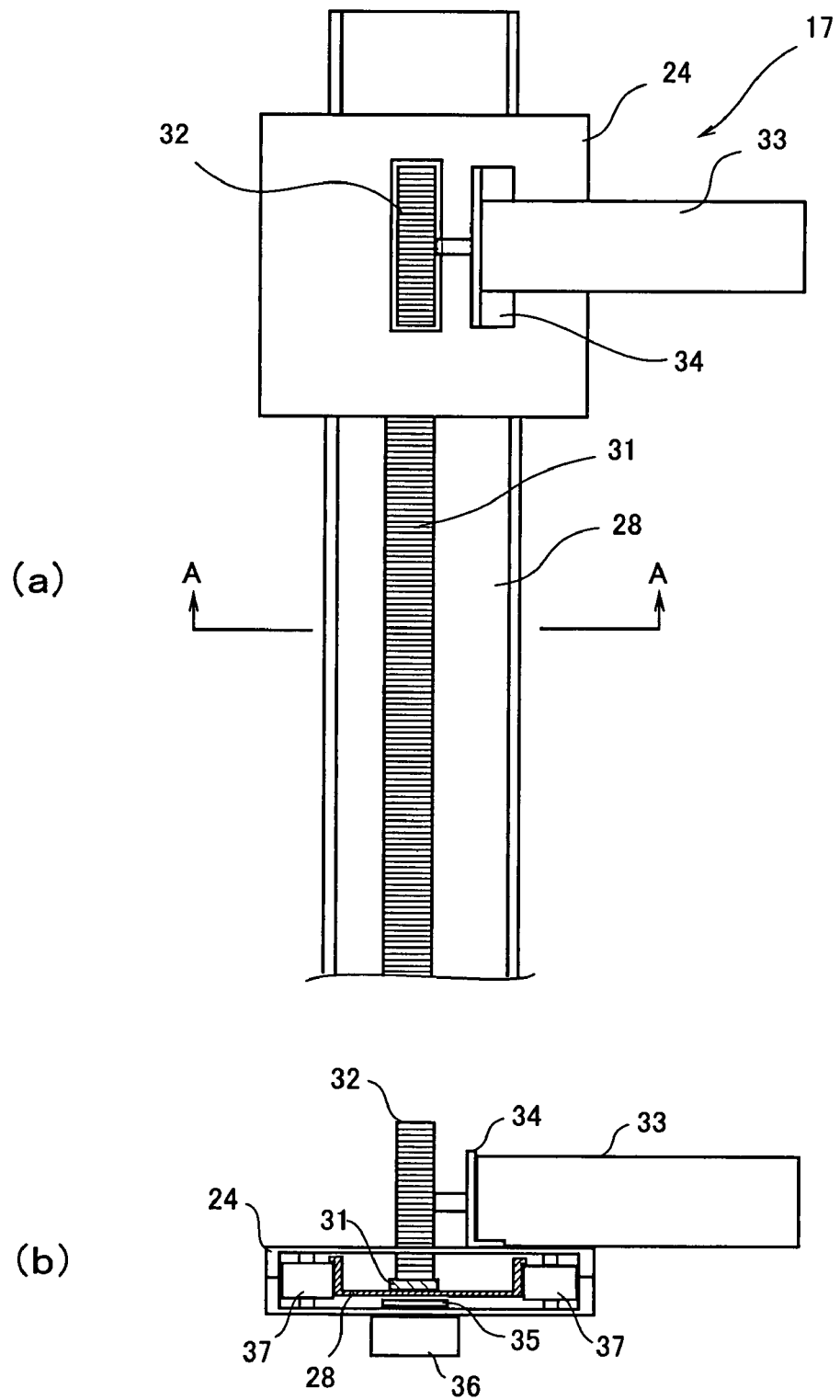
FIG. 5 is a schematic view of a sliding mechanism, wherein FIG. 5 (*a*) is a front view of the sliding mechanism, FIG. 5 (*b*) is a cross-sectional view taken along line A-A of FIG. 5 (*a*)
Figure 6:
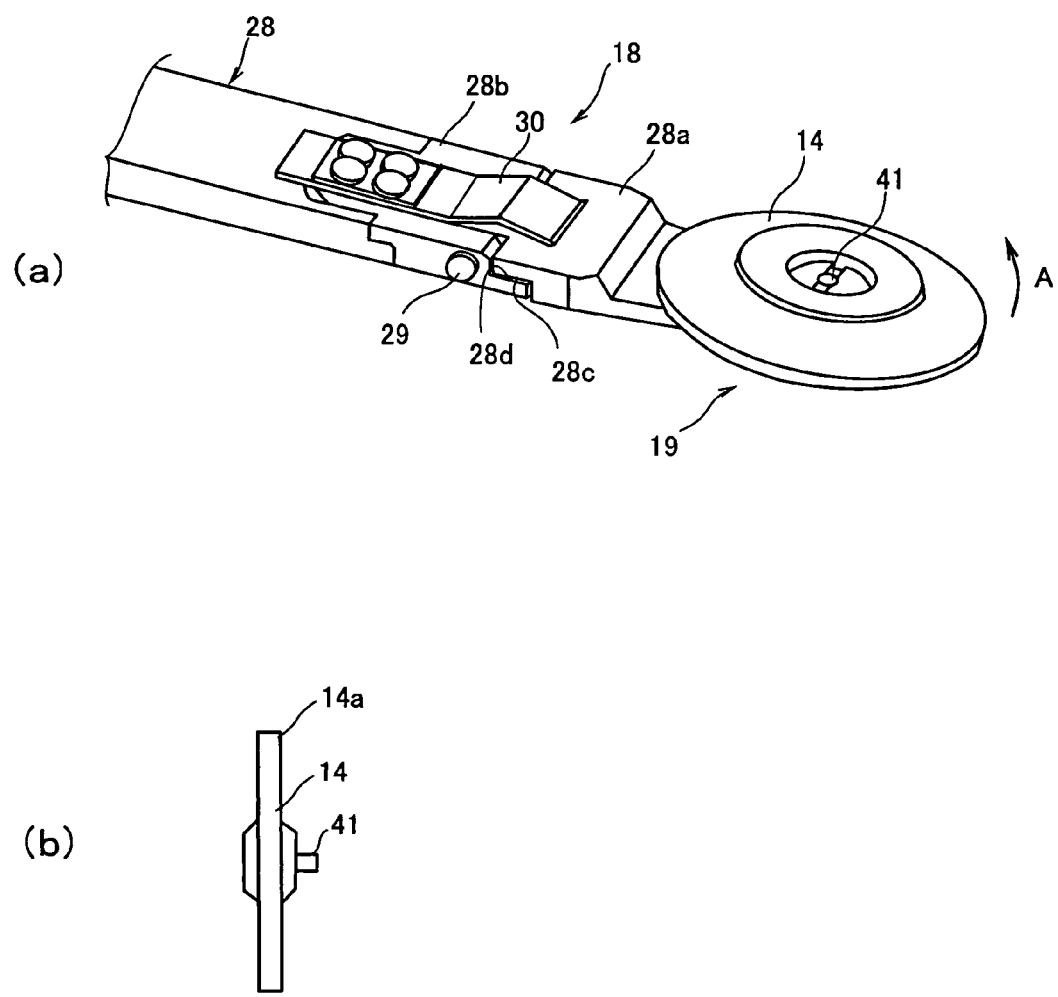
FIG. 6 is a schematic view of a bent section and a roller supporting section, wherein FIG. 6 (*a*) is an enlarged perspective view of the bent section and the roller supporting section and FIG. 6 (*b*) is a side view of a lower roller.
Figure 7:
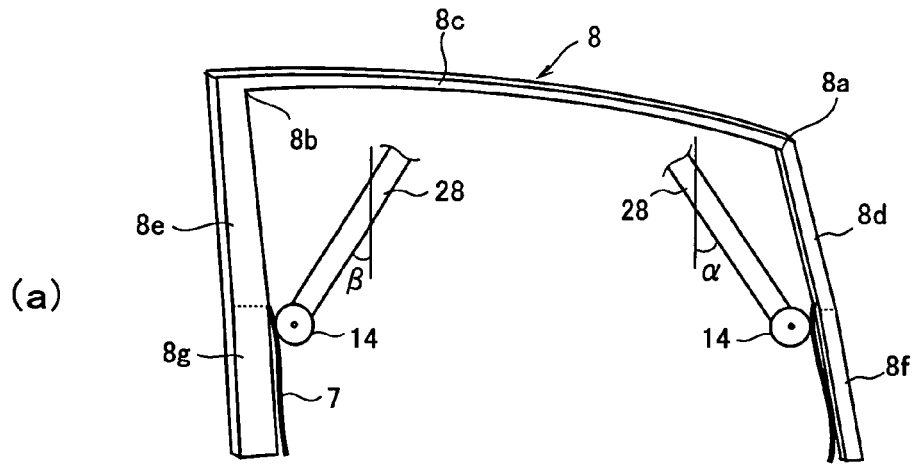
FIG. 7 is an explanatory view of the operation of the lower roller and a slider, wherein FIG. 7 (*a*) is an explanatory view of the operation of the slider, FIG. 7 (*b*) is an explanatory view of the teaching and playback trajectory of the lower roller, and FIGS. 7 (c) through (e) are explanatory views of the operation of the lower roller.
Figure 7:
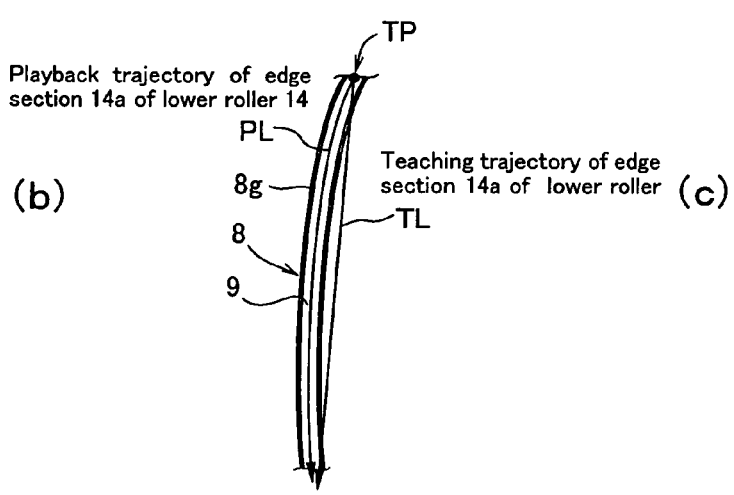
Figure 7:
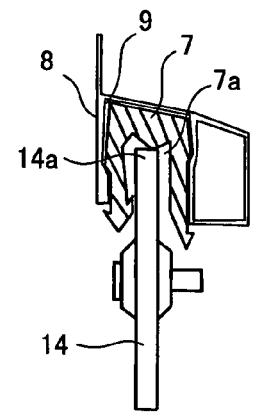
Figure 7:
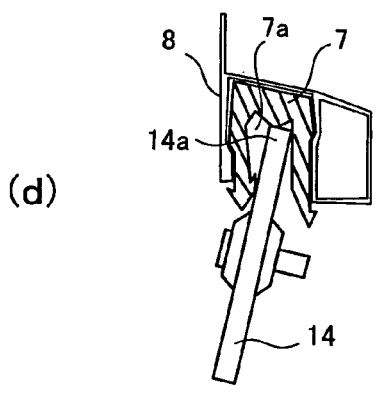
Figure 7:
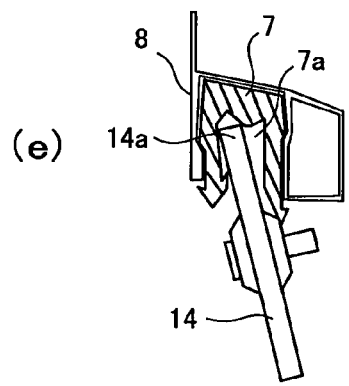
Figure 8:
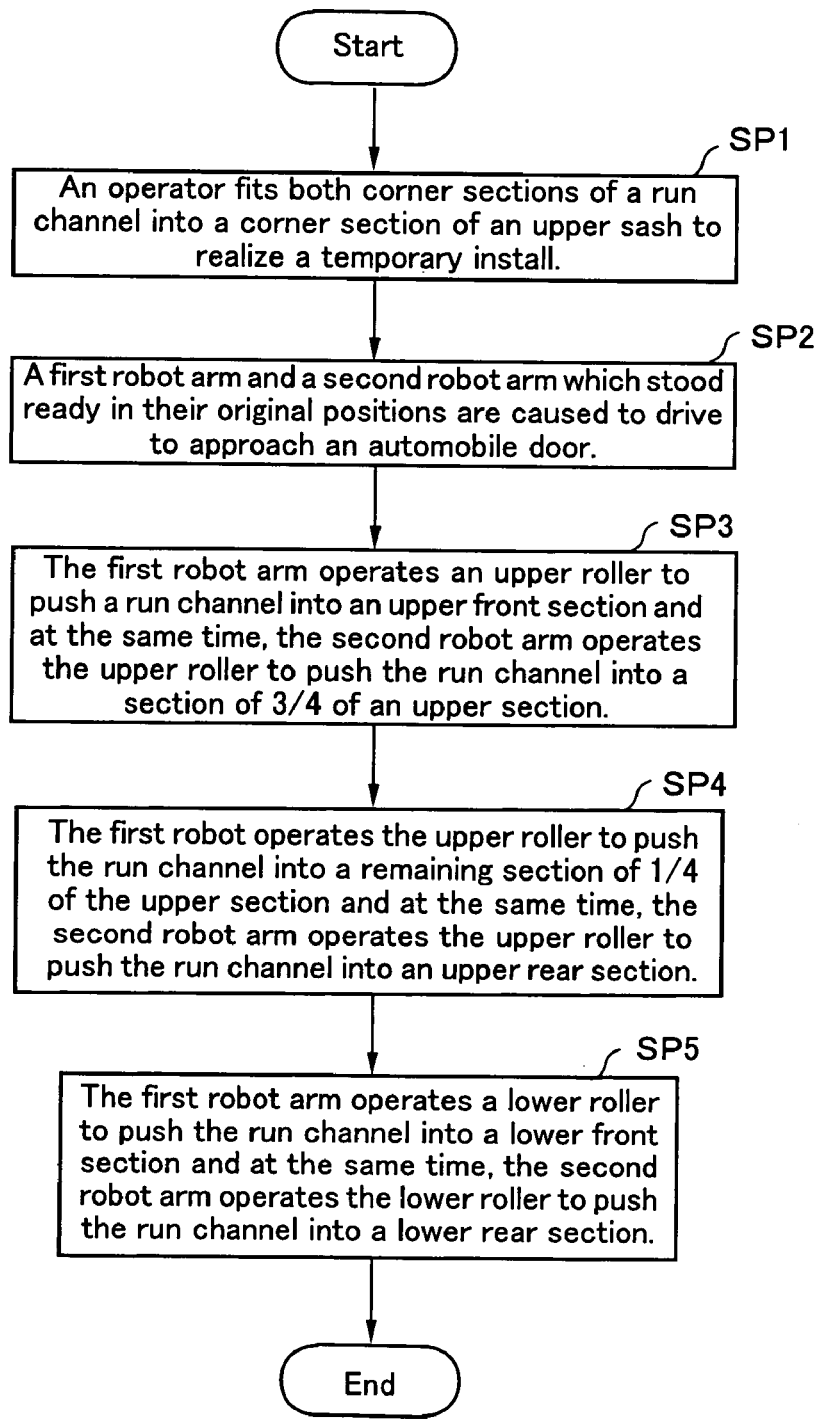
FIG. 8 is a flow chart illustrating the work procedures for fitting the run channel.
Figure 9:
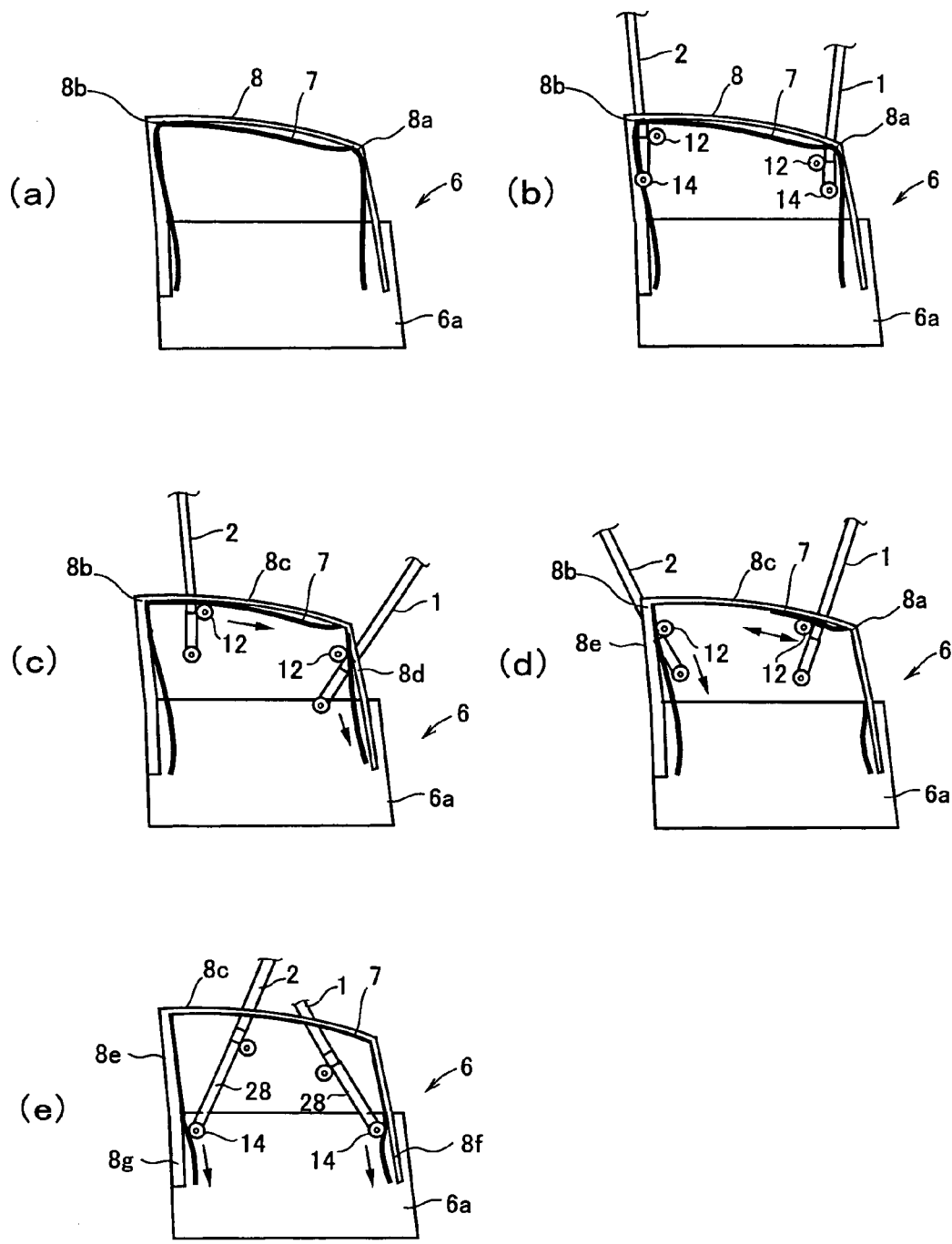
FIG. 9 is an explanatory view illustrating the work procedures for fitting the run channel, wherein FIG. 9 (a) is a fitting operation of both corner sections of the run channel into sash corner sections by an operator, FIG. 9 (b) is a preliminary operation of a robot arm, and FIGS. 9 (c) through (e) are fitting operation of the run channel by the robot arm into the automobile door sash.

A preferred embodiment of the present invention will now be described with reference to the accompanying drawings. FIG. 1 is a schematic diagram of a run channel fitting device for an automobile door according to the present invention. FIG. 2 (a) is a perspective view of the automobile door and FIG. 2 (b) is a cross-sectional view of a run channel for the automobile door. FIG. 3 is a schematic view of a run channel fitting jig. FIG. 4 is a schematic view of an upper roller and an explanatory view of the operation thereof. FIG. 5 is a schematic view of a sliding mechanism and FIG. 6 is a schematic view of a bent section and a roller supporting section. FIG. 7 is an explanatory view of the operation of a lower roller and a slider. FIG. 8 is a flow chart illustrating the work procedures for fitting the run channel and FIG. 9 is an explanatory view illustrating the run channel fitting procedures.

As shown in FIG. 1, a run channel fitting device for an automobile door according to the present invention comprises a pair of articulated robot arms consisting of a first robot arm 1 and a second robot arm 2 adapted to drive in harmony, and a run channel fitting jigs 3 attached to each end of the first robot arm 1 and the second robot arm 2.

The first robot arm 1 and the second robot arm 2 consist of triaxial (i.e., three-degree-of-freedom) arm sections 1a and 2a, and triaxial (three-degree-of-freedom) wrist sections 1b and 2b attached to the ends of the arm sections 1a and 2a, respectively and is secured to a base section 5 of which the travel axis S is a double housing type frame 4. The run channel mounting jigs 3 are secured to the wrist sections 1b and 2b. The base section 5 has a pivot shaft L between the travel axis S and the robot arms 1 and 2.

Accordingly, this device is provided with 14 axes (i.e., 14-degree-of-freedom) in total. A fitting operation of the run channel for the automobile door by the first robot arm 1 and the second robot arm 2 is taught and played back by a control device (not shown).

Further, as shown in FIG. 2 (a), the automobile door (a right front door) 6 consists of an inner panel 6a, an outer panel 6b, and an automobile door sash 8 serving as a substantially depressed member in section into which the run channel for the automobile door (hereinafter referred to as a "run channel") 7 is fitted. The run channel 7 is provided with a depressed section 7a as shown in FIG. 2 (b). A gap 6c is formed between the inner panel 6a and the outer panel 6b.

The automobile door sash 8 has a front corner section 8a and a rear corner section 8b and comprises an upper section 8c extending from the front corner section 8a to the rear corner section 8b, an upper front section 8d extending substantially vertically from the front corner section 8a, an upper rear section 8e extending substantially vertically from the rear corner section 8b, a lower front section 8f extending from the upper front section 8d to be covered by the inner panel 6a and the outer panel 6b, and a lower rear section 8g extending from the upper rear section 8e to be covered by the inner panel 6a and the outer panel 6b, each having a groove 9. In this case, the upper section 8c, the upper front section 8d and the upper rear section 8e are referred to as an upper sash, while the lower front section 8f and the lower rear section 8g are referred to as a lower sash.

As shown in FIG. 3, the run channel fitting jig 3 comprises an upper roller unit 12 for pushing the run channel 7 to fit it into the upper sash, a rotatable lower roller 14 for pushing the run channel 7 to fit it into the lower sash, and a lower roller supporting means 15 for supporting the lower roller 14 to insert it into the gap formed between the inner panel 6a and the outer panel 6b. Reference numeral 16 is a distance-measuring sensor for measuring the distance between the automobile door 6 and the run channel fitting jig 3 using a laser beam. FIG. 3 shows a run channel fitting jig 3 attached to the end of the second robot arm 2.

The upper roller unit 12 consists of three upper rollers 12a, 12b and 12c to deal with the types of models. The three upper rollers 12a, 12b and 12c are secured to a common axis member 26 at given intervals. The axis member 26 is rotatably mounted on a bracket 25 provided on a guide member 24. The bracket 25 is also provided with a driving means such as a motor 27 for rotating the axis member 26. The axis member 26 is provided to be substantially perpendicular to an attachment surface of the wrist sections 1b and 2b. Each edge section of the upper rollers 12a, 12b and 12c is formed to have such a thickness as to be inserted into the depressed section 7a of the run channel 7.

For example, as shown in FIG. 4 (a), by rotating the upper roller 12a of which the edge section 12d is press inserted into the depressed section 7a of the run channel 7, by the motor 27 to move in the direction opposite from the first robot arm 1, the run channel 7 can be surely fitted into the automobile door sash 8. In the case of the run channel 7 of which the shape is difficult to change, as shown in FIG. 4 (b), the run channel 7 can be fitted into the automobile door sash 8 by the one-degree-of-freedom motion of simply pushing the run channel 7 by the upper roller 12a.

However, in the case of the run channel 7 of which the shape can be readily changed, as shown in FIG. 4 (c), the run channel 7 can be fitted into the automobile door sash 8 if the run channel 7 is pushed into the automobile door sash 8 by a two-degree-of-freedom or three-degree-of-freedom motion such as twisting by the upper roller 12a.

The lower roller supporting means 15 consists of a sliding mechanism 17, a bending section 18 and a roller supporting section 19. The sliding mechanism 17 consists of, as shown in FIG. 5 (a), the guide member 24, a slider 28 of an elastic member and of a substantially horseshoe shape in section adapted to slidably fitting into the guide member 24, a rack 31 provided on a surface of the slider 28, a pinion 32 adapted to engage with the rack 31, a servo motor 33 attaching the pinion 32 to a rotation axis, and a control section (not shown) provided with a position sensor and a motor drive circuit for driving the servo motor 33 to control the projection amount of the slider 28. The servo motor 33 is fixedly secured to the guide member 24 through a bracket 34.

The sliding mechanism 17 is also provided, as shown in FIG. 5 (b), with a pad 35 for pushing the surface of the slider 28 opposite to the surface on which the rack 31 is provided, to prevent the slider 28 from shrinking due to loading in the case where the servo motor 33 is in a halt condition, and a cylinder 36 for imparting the given pressure force to the pad 35. The cylinder 36 is fixedly secured to the guide member 24 through a bracket (not shown). Reference numeral 37 is a roller for making the telescopic motion of the slider 28 smooth.

The bending section 18 is formed, as shown in FIG. 3, in the vicinity of the edge of the slider 28 to allow the position of the lower roller 14 to smoothly deal with the curved shape of the automobile door sash 8 by bending or twisting the slider 28. As shown in FIG. 6 (*a*), the slider 28 is divided at its edge section into a slider 28*a* for supporting the lower roller 14 and a slider 28*b* in which the rack 31 is provided. The sliders 28*a* and 28*b* are connected by an axis member 29 to form the bending section 18. Step sections 28*c* and 28*d* are respectively formed at a region where the slider 28*a* and the slider 28*b* contact. Mounted on the slider 28*b* is a leaf spring 30 for pushing the slider 28*a* in a fixed direction.

The slider 28*a* for supporting the lower roller 14 forms, as shown in FIG. 3 (*b*) and FIG. 6 (*a*), the linear slider 28 with the step sections 28*c*, 28*d* and the leaf spring 30, and with the slider 28*b* during a no operation period. When the force in the direction of the arrow A is applied to the lower roller 14, the slider 28*a* can move rotationally around the axis member 29 in the direction of the arrow A against the spring force of the leaf spring 30. However, the slider 28*a* cannot move rotationally in the direction opposite to the direction of the arrow A because the step section 28*d* of the slider 28*b* serves as a stopper.

As shown in FIG. 3 (*a*), a roller supporting section 19 is provided, in which the lower roller 14 is rotatably mounted on the axis member 41 vertically provided on the edge surface of the slider 28 made of the elastic member. The axis member 41 is provided substantially parallel to the axis member 26 of the upper roller 12. As shown in FIG. 6 (*b*), the edge section 14*a* of the lower roller 14 is formed to have a thickness which allows it to be inserted into the depressed section 7*a*.

In the case where the run channel 7 is pushed into a depressed groove 9 of the lower front section 8*f* and the lower rear section 8*g* using the lower roller 14, the slider 28 is caused to incline, as shown in FIG. 7 (*a*), by a given angle α or β relative to the vertical direction. As shown in FIGS. 7 (*b*) and (*c*), the condition in which the lower roller 14 attached to the edge of the slider 28 which is inclined by a given angle α or β pushes the depressed groove 9 on the upper end of the lower front section 8*f* and the lower rear section 8*g* through the run channel 7 is set at a teaching point TP. It is taught from this teaching point TP that the edge section 14*a* of the lower roller 14 moves downwards from above in a straight line TL along the shape of the lower front section 8*f* and the lower rear section 8*g*. In FIG. 7 (*b*), the lower rear section 8*g* is shown, but the run channel 7 is not shown.

If taught like this, the lower roller 14 attached to the edge of the slider 28 made of the elastic member is, in the playback, kept in engagement with the depressed groove 9 of the lower front section 8*f* and the lower rear section 8*g* which forms a slight curved shape in the horizontal direction by the flexure of the slider 28 by the bent section 18 and the reactive force from the lower front section 8*f* and the lower rear section 8*g* and travels in a curved line PL making a complicated motion as shown in FIGS. 7 (*d*) and (*e*). Thus, the run channel 7 is smoothly fitted into the depressed groove 9 of a substantially depressed shape in section of the lower front section 8*f* and the lower rear section 8*g*.

By utilizing the flexure of the slider 28 by the bent section 18 and the reactive force from the lower front section 8*f* and the lower rear section 8*g* by the fitting engagement of the lower roller 14 with the depressed groove 9 through the run channel 7, as shown in FIG. 7 (*b*), the travel motion of the straight line TL along the shape of the lower front section 8*f* and the lower rear section 8*g* is only taught to the lower roller 14. It is therefore possible to easily perform the teaching operation of the first robot arm 1 and the second robot arm 2 because the teaching of the travel motion copying the curved shape of the lower front section 8*f* and the lower rear section 8*g* is not needed.

The run channel fitting method for the automobile door and the operation of the run channel fitting device according to the present invention will now be described with reference to a flow chart (FIG. 8) illustrating the run channel fitting procedures and an explanatory view (FIG. 9) illustrating the run channel fitting procedures. The case where the upper roller 12*a* of the upper roller unit 12 is used is described here and the indication of the outer panel 6*b* is omitted in FIG. 9.

First, in Step SP1, as shown in FIG. 9 (*a*), an operator fits both corner sections 7*b* and 7*c* of the run channel 7 into the corner sections 8*a* and 8*b* of the upper sash 8 and inserts both ends of the run channel 7 into a gap 6*c* formed between the inner panel 6*a* and the outer panel 6*b* for temporary installation.

Next, in step SP2, the first robot arm 1 and the second robot arm 2 which stand ready in their original positions and to which the run channel fitting program is taught in advance, start driving to approach the automobile door 6 as shown in FIG. 9 (*b*). In this case, the positional relationship between the automobile door 6 and the first robot arm 1 and the positional relationship between the automobile door 6 and the second robot arm 2 are measured by a distance measuring sensor 16 respectively and as a result, the previously taught positional information may be corrected.

In step SP3, as shown in FIG. 9 (*c*), the first robot arm 1 moves the upper roller 12*a*, of which the edge section 12*d* is press inserted into the depressed section 7*a* in the vicinity of the front corner section 8*a*, to the lower end of the upper front section 8*d* to fit the run channel 7 in order from the upper front section 8*d* in the vicinity of the front corner section 8*a*.

In this case, the upper roller 12*a* rotates at the same travel speed with or a slightly faster travel speed than the first robot arm 1 in the direction opposite from the first robot arm 1. In this manner, the run channel 7 can be smoothly fitted into the upper front section 8*d* without causing undulation because the upper roller 12*a* is caused to rotate to move in the direction opposite from the first robot arm 1.

On the other hand, the second robot arm 2 also moves the upper roller 12 of which the edge section 12*d* is press inserted into the depressed section 7*a* in the vicinity of the rear corner section 8*b* to a position of about ¾ of the upper section 8*c* toward the front corner section 8*a* to successively fit the run channel 7 in position from the upper section 8*c* in the vicinity of the rear corner section 8*b*.

In this case, the upper roller 12 also rotates at the same or a slightly faster travel speed than the second robot arm 2 in the direction to move in the opposite direction from the second robot arm 2. In this manner, the run channel can be smoothly fitted into the upper section 8*c* without causing undulation because the upper roller 12 is caused to rotate to move in the direction opposite from the second robot arm 2. Next, in step SP4, as shown in FIG. 9 (*d*), the first robot arm 1 reciprocates the upper roller 12 of which the edge section 12*d* is press inserted into the depressed section 7*a* in the vicinity of the front corner section 8*a* by the distance of about ⅔ of the upper section 8*c* toward the rear corner section 8*b* from the front corner section 8*a* to push the run channel 7 into a remaining section of about ¼ of the upper section 8*c*.

In this case, the upper roller 12 rotates at the same or a slightly faster travel speed than the first robot arm 1 in the direction opposite from the first robot arm 1. In this manner, the run channel 7 can be smoothly fitted into the upper section 8c without causing undulation because the upper roller 12 is caused to rotate to move in the direction opposite from the first robot arm 1.

On the other hand, the second robot arm 2 also moves the upper roller 12 of which the edge section 12d is press inserted into the depressed section 7a in the vicinity of the rear corner section 8b to successively push the run channel 7 in position from the upper rear section 8e in the vicinity of the rear corner section 8b.

In this case, the upper roller 12 also rotates at the same or a slightly faster travel speed than the second robot arm 2 in the direction to move in the opposite direction from the second robot arm 2. In this manner, the run channel 7 can be smoothly fitted into the upper rear section 8e without causing undulation because the upper roller 12 is caused to rotate to move in the direction opposite from the second robot arm 2.

Next, in step SP5, when the sliding mechanism 17 is driven to extend the slider 28 to a given length as shown in FIG. 9 (e), the first robot arm 1 moves the lower roller 14 of which the edge section 14a is press inserted into the depressed section 7a in the vicinity of the upper front section 8d to the lower end of the lower front section 8f, slidably and rotationally moving the lower roller 14, to successively push the run channel 7 in position from the upper section of the lower front section 8f in the vicinity of the upper front section 8d.

In this case, as shown in FIG. 7 (a), the slider 28 of which the end is provided with the lower roller 14 pushes the lower roller 14 against the run channel 7 by providing a given angle α relative to the vertical direction. As shown in FIGS. 7 (b) and (c), the lower roller 14 is caused to play back the teaching trajectory TL from the teaching point TP of the condition in which the lower roller is pushed against the run channel 7.

As shown in FIGS. 7 (d) and (e), the run channel 7 can be smoothly fitted into the depressed groove 9 of a substantially depressed shape in a section of the lower front section 8f because the lower roller 14 moves in the curved line PL in a complicated motion by keeping the fitting condition with the depressed groove 9 of the lower front section 8f through the run channel by the flexure of the slider 28 and the reactive force from the lower front section 8f.

However, in the case of a specific model in which the curved shape of the front sash (i.e., the upper front section 8d and the lower front section 8f) and the rear sash (i.e., the upper rear section 8e and the lower rear section 8g) along the curved shape of the automobile door 6 is tight, the lower roller 14 moves in the direction of the arrow A by the action of the bending section 18. By such a movement of the lower roller 14 in the direction of the arrow A, the run channel 7 can be smoothly fitted into the front sash and the rear sash with the curved shape which can not be dealt with by only the flexure of the slider 28.

On the other hand, when the sliding mechanism 17 is driven to extend the slider 28 to a given length, the second robot arm 2, like the first robot arm 1, also moves the lower roller 14 of which the edge section 14a is press inserted into the depressed section 7a in the vicinity of the upper rear section 8e, to the lower end of the lower rear section 8g, making a complicated move, to push the run channel 7 in order from the upper section of the lower rear section 8g in the vicinity of the upper rear section 8e. In this case, the slider 28 of which the edge is provided with the lower roller 14 pushes the lower roller 14 against the run channel 7 providing a given angle β relative to the vertical direction. This is because the second robot arm 2 achieves the same effect as the first robot arm 1.

When the fitting of the run channel 7 into the lower front section 8f and the lower rear section 8g is over, the first robot arm 1 and the second robot arm 2 pull each lower roller 14 out of the gap 6c formed between the inner panel 6a and the outer panel 6b to return to their original positions. Thus, the fitting operation of the run channel 7 into the automobile door sash 8 is completed.

INDUSTRIAL APPLICABILITY

The present invention contributes to the reduction of manpower in the fitting operation of an automobile door run channel with a long soft body into an automobile door sash. It is also possible to ensure the improvement and stability of the assembly quality of the automobile door run channel.

EFFECTS OF THE INVENTION

According to the first to third aspects of the present invention, a soft-bodied run channel for an automobile door can be fitted into an upper sash and a lower sash of an automobile door sash with a high degree of accuracy. It is also possible to attain the improvement of assembly quality, reduction and stability of assembly manpower of the run channel for the automobile door.

According to the fourth aspect of the present invention, the run channel for the automobile door can be fitted into the upper sash of the automobile door sash by the rotation of the upper roller with accuracy and rapidity.

According to the fifth aspect of the present invention, the run channel for the automobile door can be fitted into the lower sash of the automobile door sash with accuracy and rapidity by means of the lower roller supporting means provided with the bending section for the lower roller to move along the curved section of the lower sash.

What is claimed is:

1. An automobile run channel fitting method for fitting a run channel into an automobile door sash using robot arms comprising the steps of:
   press-inserting an upper roller attached to at least one of the robot arms into a depressed section of the run channel to move the upper roller from a corner section of an upper sash, thereby fitting the run channel into the upper sash; and
   press-inserting a lower roller attached to the at least one of the robot arms into a depressed section of the run channel to move the lower roller downwards from an upper section of a lower sash, thereby fitting the run channel into the lower sash, wherein the lower sash is entirely disposed in a gap defined between an inner panel and an outer panel of the automobile door.

2. An automobile run channel fitting method for fitting a run channel into an automobile door sash using robot arms comprising the steps of comprising the steps of:
   after an operator pushes both corner sections of the run channel into a corner section of an upper sash, press-inserting an upper roller attached to at least one of the robot arms into a depressed section of the run channel to move the upper roller from a corner section of the upper sash, thereby fitting the run channel into the upper sash; and
   press-inserting a lower roller attached to the at least one of the robot arms into a depressed section of the run channel to move the lower roller downwards from an upper section of a lower sash, thereby fitting the run channel into the lower sash, wherein the lower sash is entirely disposed in a gap defined between an inner panel and an outer panel of the automobile door.

* * * * *